United States Patent
Schoeny et al.

(10) Patent No.: US 11,284,557 B2
(45) Date of Patent: Mar. 29, 2022

(54) PLUGGING CONTROL FOR AN AGRICULTURAL IMPLEMENT

(71) Applicant: CNH Industrial America LLC, New Holland, PA (US)

(72) Inventors: Christopher Schoeny, Minooka, IL (US); Trevor Stanhope, Palos Hills, IL (US); Darian Landolt, Evanston, IL (US)

(73) Assignee: CNH Industrial America LLC, New Holland, PA (US)

( * ) Notice: Subject to any disclaimer, the term of this patent is extended or adjusted under 35 U.S.C. 154(b) by 441 days.

(21) Appl. No.: 16/367,847

(22) Filed: Mar. 28, 2019

(65) Prior Publication Data

US 2020/0305335 A1    Oct. 1, 2020

(51) Int. Cl.
| A01B 71/08 | (2006.01) |
| A01B 79/00 | (2006.01) |
| A01C 5/06  | (2006.01) |

(52) U.S. Cl.
CPC ............. *A01B 71/08* (2013.01); *A01B 79/005* (2013.01); *A01C 5/064* (2013.01); *A01C 5/068* (2013.01)

(58) Field of Classification Search
CPC ....... A01B 49/06; A01B 61/00; A01B 63/111; A01B 71/08; A01B 76/00; A01B 79/005; A01C 5/064; A01C 5/068; A01C 7/20; A01C 7/205

See application file for complete search history.

(56) References Cited

U.S. PATENT DOCUMENTS

| 5,640,914 | A  |   | 6/1997  | Rawson |
| 5,819,512 | A  | * | 10/1998 | Steffen ................. A01D 46/085 |
|           |    |   |         | 56/10.2 R |
| 7,216,555 | B2 |   | 5/2007  | Drummond et al. |
| 8,006,775 | B2 |   | 8/2011  | Steinlage et al. |
| 8,104,543 | B2 |   | 1/2012  | Helsa |
| 8,408,149 | B2 |   | 4/2013  | Rylander |
| 8,522,889 | B2 |   | 9/2013  | Adams et al. |
| 8,925,471 | B2 |   | 1/2015  | Adams et al. |
| 9,137,943 | B2 |   | 9/2015  | Wendte et al. |
| 9,405,039 | B2 | * | 8/2016  | Anderson .............. A01B 79/00 |
| 9,485,900 | B2 | * | 11/2016 | Connell ................. A01B 21/08 |
| 9,554,098 | B2 |   | 1/2017  | Casper et al. |
| 9,743,574 | B1 |   | 8/2017  | Maxton et al. |

(Continued)

OTHER PUBLICATIONS

Denny Cobb, "Crop Talk," Beck's Hybrids eCropTalk Newsletter, Mar. 2009, pp. 1-6, www.beckshybrids.com.

(Continued)

*Primary Examiner* — Gary S Hartmann
(74) *Attorney, Agent, or Firm* — Rebecca L. Henkel; Rickard K. DeMille (57) ABSTRACT

A plugging control system for an agricultural implement includes a sensor configured to output a sensor signal indicative of plugging of a ground engaging component and a controller having a processor and a memory. The processor is configured to receive the sensor signal indicative of plugging of the ground engaging component from the sensor, determine whether the plugging exceeds a threshold value, and in response to the plugging exceeding the threshold value, output a monitoring signal to perform a monitoring operation, output a control signal to perform a control operation, or both.

20 Claims, 7 Drawing Sheets

(56) References Cited

U.S. PATENT DOCUMENTS

| | | | |
|---|---|---|---|
| 9,936,631 B1 | 4/2018 | Hubner et al. | |
| 10,492,353 B2* | 12/2019 | Kovach | A01B 49/027 |
| 10,765,052 B2* | 9/2020 | DeGarmo | A01B 21/08 |
| 10,918,006 B2* | 2/2021 | Shearer | A01B 63/112 |
| 11,058,045 B2* | 7/2021 | Harmon | A01B 79/005 |
| 2013/0192855 A1 | 8/2013 | Meek | |
| 2015/0375247 A1 | 12/2015 | Funseth et al. | |
| 2016/0088787 A1 | 3/2016 | Connell et al. | |
| 2017/0112043 A1 | 4/2017 | Nair et al. | |
| 2018/0092303 A1 | 4/2018 | Goering et al. | |

OTHER PUBLICATIONS

"New DB44 24Row22 Planter," pp. 1-64, retrieved on May 7, 2018 from https://www.stotzequipment.com/new-equipment/agriculture/planting-and-seeding/planters/db-planter-series/db44-24row22/.

"Guide to No-till Seeding", Exapta Solutions, Inc., pp. 1-18, retrieved on May 7, 2018 from https://www.exapta.com/working-knowledge/guide-to-no-till-seeding/.

* cited by examiner

PLUGGING CONTROL FOR AN AGRICULTURAL IMPLEMENT

BACKGROUND

The disclosure relates generally to plugging control for an agricultural implement.

Generally, agricultural implements are towed behind a work vehicle, such as a tractor, or are included as part of a work vehicle. The agricultural implements generally contain a particulate material, such as seeds, fertilizer, and/or other agricultural product, which is distributed on or in the ground using various methods. For example, certain implements form a furrow in the ground, deposit a seed in the furrow, and then close the furrow over the seed. Proper forming and closure of the furrow may enhance seed germination and crop production. In some instances, the agricultural implement may not properly form or close the furrow due to plugging of components of the agricultural implement. For example, certain components may become plugged with soil, mud, root balls, rocks, and other impediments that may prevent or hinder proper operation of the components.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, a plugging control system for an agricultural implement includes a sensor configured to output a sensor signal indicative of plugging of a ground engaging component and a controller having a processor and a memory. The processor is configured to receive the sensor signal indicative of plugging of the ground engaging component from the sensor, determine whether the plugging exceeds a threshold value, and in response to the plugging exceeding the threshold value, output a monitoring signal to perform a monitoring operation, output a control signal to perform a control operation, or both.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Certain embodiments of the present disclosure include a plugging control system for an agricultural implement and/or a work vehicle. Certain agricultural implements are towed by a work vehicle or are included as part of a work vehicle (e.g., a high-clearance sprayer) and are configured to open a furrow in a field, deposit agricultural product (e.g., seed, fertilizer, etc.), and close the furrow. For example, certain agricultural implements include row units that form furrows along rows of the field, deposit the agricultural product in the furrows, and close the furrows. During operation of the row units, certain ground engaging components (e.g., residue managers, opening disks, and closing disks) of the row units may become plugged with dirt, mud, rocks, root balls, crop residue, and other types of residue and impediments. As described herein, plugging may include residue buildup, partial blockage of portion(s) of the ground engaging component from rotating, complete blockage of the portion(s) of the ground engaging component from rotating, lodging of the residue/impediments within the ground engaging component that at least partially prevents the ground engaging component from performing the appropriate task (e.g., opening/forming the furrow, closing the furrow, etc.), obstructing movement of the ground engaging component by an actuator, or a combination thereof. The plugging may prevent efficient operation of the ground engaging component. For example, plugging of the opening disks may prevent the opening disks from adequately forming the furrow, and plugging of the closing disks may prevent the closing disks from adequately closing the furrow.

Certain agricultural implements and/or row units of the agricultural implements include a sensor that senses parameters associated with the ground engaging component that indicate plugging (e.g., senses a strain on the ground engaging component, a rotational value and/or a position/orientation of the ground engaging component, a visual or auditory presence of plugging, etc.). The sensor outputs a sensor signal indicative of the plugging to a controller of the plugging control system. The controller may compare the plugging to a threshold value and, based on the plugging exceeding the threshold value, output a monitoring signal to perform a monitoring operation and/or output a control signal to perform a control operation. In certain embodiments, the plugging control system may include a user interface, and the controller may be configured to output the monitoring signal to the user interface. In response to receiving the monitoring signal, the user interface may provide an indication of the plugging to alert/inform an operator of the agricultural implement.

The controller may output the control signal to an actuator of the row unit to move the ground engaging component or the row unit. In response to receiving the control signal, the actuator may perform the appropriate movement of the ground engaging component. Such movement may include adjusting a vertical position of the ground engaging component relative to the soil and/or relative to a chassis of the row unit, shaking the ground engaging component and/or the row unit, adjusting an orientation and/or positions of portions of the ground engaging component relative to one another, adjusting a pressure applied to the ground engaging component and/or the row unit, other movements of the ground engaging component and/or the row unit, or a combination thereof. The movement of the ground engaging component and/or of the row unit may dislodge the residue plugged and stuck in the ground engaging component. In certain embodiments, the plugging control system may continue to sense whether the ground engaging component remains plugged. If the ground engaging component remains plugged after performing the control operation, the controller may output the monitoring signal to notify the operator of the plugging and/or of the attempt to dislodge the plugging materials. As such, the plugging control system may allow for more efficient operation of the agricultural implement and/or may notify an operator of a potential issue (e.g., a potential issue caused by plugging).

Figure 1:
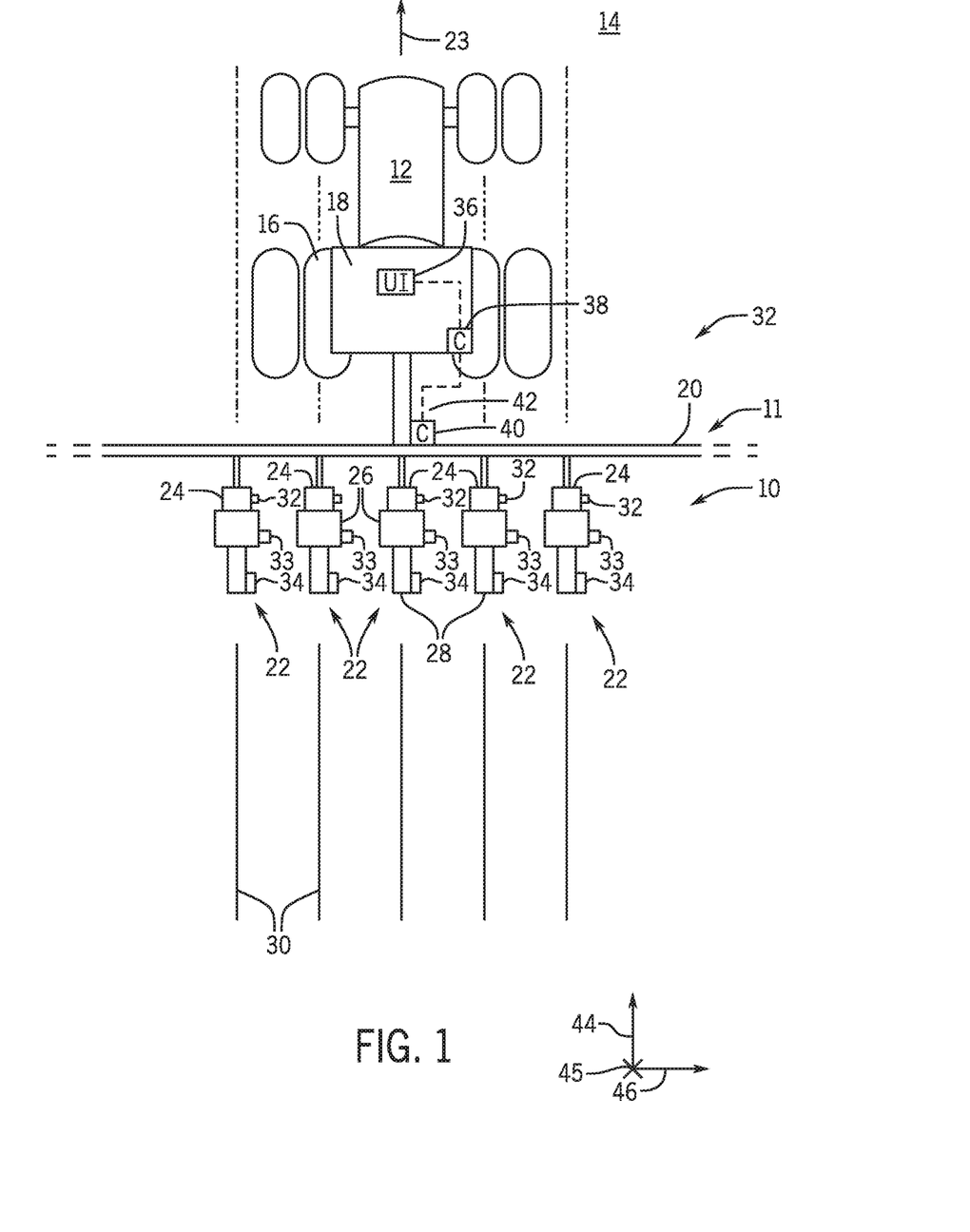
FIG. 1 is a top view of an embodiment of a work vehicle and an agricultural implement disposed in a field and having a plugging control system, in accordance with an aspect of the present disclosure.

With the foregoing in mind, the present embodiments relating to a plugging control system may be utilized in any suitable agricultural implement and/or work vehicle. For example, FIG. 1 is a top view of an embodiment of a plugging control system 10 of an agricultural implement 11 and a work vehicle 12. As illustrated, the agricultural implement 11 is coupled to the work vehicle 12. The agricultural implement 11 and the work vehicle 12 are disposed in a field 14. The work vehicle 12 includes drive wheels 16 that rotate to move the work vehicle 12 through the field 14. In certain embodiments, the work vehicle 12 may include other travel mechanisms (i.e., a track system) to move the work vehicle 12. The work vehicle 12 also includes a cab 18 that houses an operator of the agricultural implement 11 and the work vehicle 12. For example, the operator may be positioned in the cab 18 while the work vehicle 12 moves through the field 14. The agricultural implement 11 includes a frame 20 coupled to row units 22. As illustrated, the work vehicle 12 is coupled to the frame 20. As such, the work vehicle 12 may tow the agricultural implement 11, via the frame 20, through the field 14 in a direction 23.

Each row unit 22 includes ground engaging components (e.g., a residue management system 24, an opening system 26, and a closing system 28) that conform soil of the field 14, form a row 30 in the field 14 (i.e., a furrow, furrow, cut, and/or opening in a seedbed), deposit agricultural product into the row 30, and close the row 30 as the agricultural implement 11 is towed through the field 14. For example, the residue management system 24 clears the surface of the field 14 of residue (e.g., clods, debris, etc.) as the row unit 22 moves over the surface. The opening system 26 then penetrates the soil of the field 14 to form the row 30. After forming the row 30, an agricultural product (e.g., seed, fertilizer, etc.) may be delivered to the soil by each respective row unit 22 to the rows 30 (i.e., into the furrow). For example, the agricultural product may include seeds that mature into a harvestable crop. After delivery of the agricultural product to the row 30, the closing system 28 of each respective row unit 22 displaces soil into the row 30 and over the seeds. The closing system 28 may partially or completely fill the furrow of the row 30 with the soil.

As the row units 22 travel over the field 14, the ground engaging components of certain row units 22 may become plugged with soil and debris of the field 14. As illustrated, the plugging control system 10 and each row unit 22 includes sensors (e.g., residue management system sensor(s) 32, opening system sensor(s) 33, and closing system sensor(s) 34) that output signals indicative of plugging. For example, the sensors may sense certain parameters associated with operation of the row units 22 that may indicate plugging of the ground engaging components. As such, the residue management system sensors 32 may output signals indicative of plugging of the residue management system 24 (e.g., plugging of residue managers), the opening system sensors 33 may output signals indicative of plugging of the opening system 26 (e.g., plugging of opening disks), and the closing system sensors may output signals indicative of plugging of the closing system 28 (e.g., plugging of closing disks).

In certain embodiments, each row unit 22 may include actuator(s) configured to move the row unit 22 and/or the ground engaging components of the row unit 22 (e.g., the residue management system 24, the opening system 26, the closing system 28, or a combination thereof). In certain embodiments, the actuator(s) may be controlled based on the plugging of the ground engaging components as sensed by the sensors, among other factors. For example, the sensors may output sensor signals indicative of the plugging of the ground engaging components to a controller of the plugging control system 10, and the controller may output control signals to the actuators indicative of instructions to move the ground engaging components. In certain embodiments, the controller may output the control signals indicative of instructions to move the ground engaging components to another controller (e.g., a closing system controller) configured to regulate the actuators. The movement of the ground engaging components and/or of the row units by the actuators may cause the ground engaging components to become unplugged (e.g., may dislodge and/or remove the soil and the debris from the ground engaging components).

The work vehicle 12 includes a user interface 36 and a work vehicle controller 38. As illustrated, the user interface 36 and the work vehicle controller 38 are disposed in the cab 18 of the work vehicle 12. In certain embodiments, the user interface 36 and/or the work vehicle controller 38 may be disposed remotely from the work vehicle 12. The work vehicle controller 38 may control certain operations of the work vehicle 12 and/or of the plugging control system 10. The agricultural implement 11 includes an agricultural implement controller 40. The agricultural implement controller 40 may control certain operations of the agricultural implement 11 and/or of the plugging control system 10. In certain embodiments, one or more of the row units 22 may include row unit controllers that control certain operations of the row units 22 and/or the plugging control system 10. The operator disposed in the cab 18 or disposed remotely may interact with the user interface 36 to control the plugging control system 10, the agricultural implement 11, the work vehicle 12, or a combination thereof. For example, the user interface 36 may display values, indicators, alerts, and other information related to plugging at each row unit 22 and/or may display selectable options for operating modes of the plugging control system 10.

As illustrated, the user interface 36, the work vehicle controller 38, and the agricultural implement controller 40 are connected via a network 42. The network 42 may include a wired connection (e.g., Ethernet, universal serial bus (USB), CANbus, ISObus, other suitable wired connections, or a combination thereof) and/or a wireless connection (e.g., Wi-Fi, Bluetooth, other suitable wireless connections, or a combination thereof) between the user interface 36, the work vehicle controller 38, the agricultural implement controller 40, other components of the plugging control system 10, or a combination thereof. Further, the network 42 may include one or more connections on different transport protocols. Additionally or alternatively, each row unit 22 have a CAN network that enables closed loop control of the plugging control system 10 at the row units 22. As such, the network 42 enables the user interface 36, the work vehicle controller 38, the agricultural implement controller 40, the other components of the plugging control system 10, or the combination thereof, to communicate via wired and/or wireless signals.

The work vehicle controller 38 and/or the agricultural implement controller 40 may receive the signals indicative of the plugging as output by the sensors 32, 33, and 34. In certain embodiments, the signals output by the sensors 32, 33, and 34 may pass through and/or be processed by respective row unit controllers prior to being received by the work vehicle controller 38 and/or the agricultural implement controller 40. For example, a respective row unit controller may receive signals from a respective residue management system sensor 32, a respective opening system sensor 33, a respective closing system sensor 34, or a combination thereof, may process the signals through a filter, and may output signals indicative of the plugging to the work vehicle controller 38 or the agricultural implement controller 40. Based on the plugging at the particular ground engaging component(s), the work vehicle controller 38 or the agricultural implement controller 40 may output a signal to the user interface 36 to notify the operator of the plugging at the ground engaging component(s). Additionally, based on the plugging, the work vehicle controller 38 or the agricultural implement controller 40 may output a control signal to the respective row unit 22 (e.g., to an actuator of the respective row unit 22) indicative of instructions to move the ground engaging component. In certain embodiments, some or all of the residue management system sensors 32, some or all of the opening system sensors 33, some or all of the closing system sensors 34, or a combination thereof, may be omitted from the plugging control system 10.

As described herein, the plugging control system 10 may compare the sensed plugging to a threshold value and may perform monitoring operation(s) and/or the control operation(s) based on the plugging exceeding the threshold value. The threshold value may be based on operator inputs, inputs determined by the controller, inputs sensed by sensors of the plugging control system 10, or a combination thereof. Such inputs may include an orientation and/or a position of the row unit 22 or of the ground engaging component of the row unit 22, soil moisture, other soil conditions and properties, weather, a type of the agricultural product applied by the agricultural implement 11, environmental conditions, and other conditions. The plugging of a particular ground engaging component may provide an indication of the performance of the ground engaging component, the performance of the row unit 22 generally, soil properties, and other soil mechanics. As such, the user may be notified of such indications and/or the plugging control system 10 may automatically take corrective action to improve the performance of the ground engaging component or the row unit 22 generally, which may result in increased retention of the agricultural product within the soil, increased harvestable crops, and other benefits.

In certain embodiments, the agricultural implement 11 may be controlled by sections (e.g., the row units 22 may be divided into groups or sections). The plugging control system 10 may control the sections (e.g., move the sections) based on the plugging at the respective sections. For example, based on a sensed plugging by the sensors 32, 33, or 34 at an individual row unit 22, the plugging control system 10 may perform a control operation at each row unit 22 of the section to which the individual row unit 22 belongs (e.g., output a control signal to an actuator at each row unit 22). Additionally, the user may be notified of which section of the agricultural implement 11 to which the individual row unit 22 belongs. In some embodiments, the agricultural implement 11 may include an actuator that moves multiple row units 22 concurrently. For example, the actuator may move a wing or a section of the row units 22 and may be controlled based on the sensed plugging at the row units 22. For purposes of discussion, reference may be made to a longitudinal axis or direction 44 parallel to the direction 23 of travel of the agricultural implement 11, a vertical axis or direction 45, and a lateral axis or direction 46.

Figure 2:
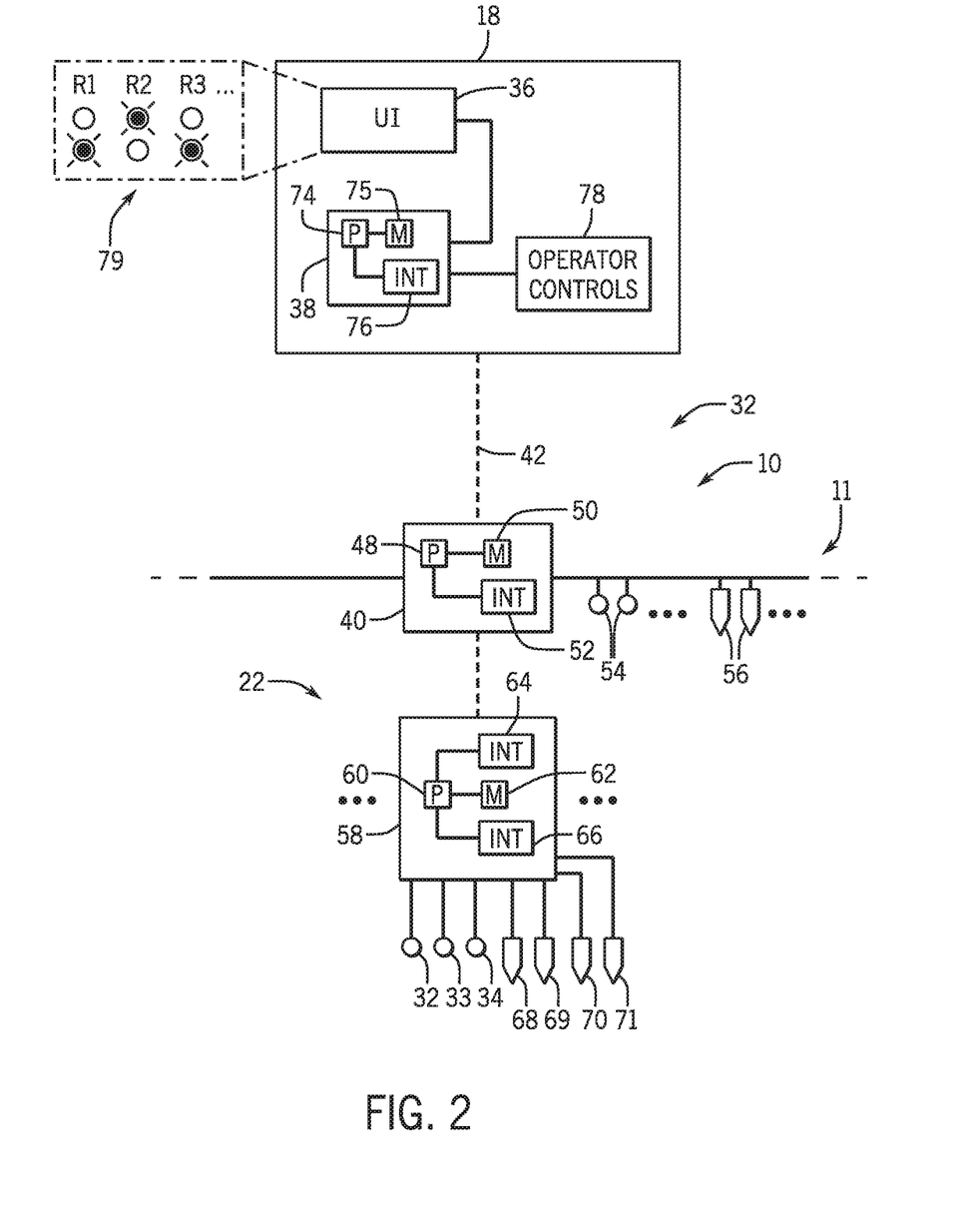
FIG. 2 is a schematic view of the plugging control system of FIG. 1, in accordance with an aspect of the present disclosure.

FIG. 2 is a schematic view of the plugging control system 10 of FIG. 1. As illustrated, the plugging control system 10 includes the work vehicle controller 38 disposed generally in the cab 18 of the work vehicle and the agricultural implement controller 40 of the agricultural implement 11. The agricultural implement controller 40 includes a processor 48, a memory 50, and an interface 52. The agricultural implement controller 40 is configured to control operations and measure parameters of the agricultural implement 11. For example, the agricultural implement controller 40 may receive signals from implement sensors 54 at the processor 48 and via the interface 52. The implement sensors 54 may include sensors that sense various parameters associated with operation of the implement 11. For example, the implement sensors 54 may sense a tire pressure, a down force on a component of a row unit 22, and other parameters associated with the operation of the agricultural implement 11. Such measured parameters may be stored in the memory 50.

The agricultural implement controller 40 may also output signals to implement actuators 56 via the processor 48 and the interface 52. The implement actuators 56 may include actuators that modify aspects of certain components of the agricultural implement 11. For example, the implement actuators 56 may adjust positions of certain implement components, a tire pressure, and other parameters associated with the operation of the agricultural implement 11. In certain embodiments, the processor 48 may execute instructions stored in the memory 50 to output signals to the implement actuators 56. The signals output to the implement actuators 56 may be in response to the signals received from the implement sensors 54.

As illustrated, the plugging control system 10 includes a row unit controller 58 at the row unit 22 of the agricultural implement 11. The agricultural implement 11 may include a respective row unit controller 58 at some or all of the row units 22. The row unit controller 58 includes a processor 60, a memory 62, a first interface 64, and a second interface 66. The row unit controller 58 is configured to control operations and/or measure parameters of the row unit 22. For example, as illustrated, the row unit controller 58 is coupled to the residue management system sensors 32, the opening system sensors 33, and the closing system sensors 34. Additionally, as illustrated, the row unit controller 58 is coupled to a row unit actuator 68, a residue management system actuator 69, an opening system actuator 70, and a closing system actuator 71.

As described herein, the residue management system sensors 32, the opening system sensors 33, and the closing system sensors 34 are configured to sense certain parameters associated with the row unit 22. For example, the sensors 32, 33, and/or 34 may sense parameters indicative of plugging of the ground engaging components of the row unit 22. Such sensed parameters may include a strain on a linkage of the ground engaging component, a position and/or orientation of the ground engaging component with respect to the surface of the field and/or with respect to other portion(s) of the row unit 22, visual sensing of the plugging, other sensed parameters indicative of plugging, or a combination thereof. The sensors 32, 33, and 34 may output sensor signals to the row unit controller 58 indicative of the plugging or indicative of the actual sensed parameters (e.g., the strain, the position/orientation, etc.). The signals output by the sensors 32, 33, and 34 may be received by the processor 60 via the second interface 66. In response, the processor 60 may output signals to the work vehicle controller 38 and/or the agricultural implement controller 40 via the first interface 64. In certain embodiments, the measurements sensed by the sensors 32, 33, and 34 may be stored in the memory 62 of the row unit controller 58. In some embodiments, the row unit controllers 58 of each row unit 22 may communicate with one another (e.g., may send signals indicative of respective plugging at each row unit 22), and/or the plugging control system 10 may perform the control operation and/or the monitoring operation at certain row units 22 based on the sensor signals and measurements at other row units 22.

The actuators of the plugging control system 10 may move, shake, adjust an orientation of, and/or adjust a down pressure applied to the ground engaging components of the row unit 22. For example, the row unit actuator 68, the residue management system actuator 69, the opening system actuator 70, and the closing system actuator 71 may move, shake, adjust an orientation of, and/or adjust a down pressure applied to the row unit 22, the residue management system, the opening system, and the closing system, respectively. In certain embodiments, the row unit 22 may include additional actuators that adjust a spacing/gap between closing disks of the closing system, a down pressure applied to the press wheel, and other parameters associated with the operation of the row unit 22. In certain embodiments, the additional actuators may adjust certain aspects of the row unit 22 based on the signals received from the sensors 32, 33, and 34.

As illustrated, the work vehicle controller 38 includes a processor 74, a memory 75, and an interface 76. The work vehicle controller 38 is configured to control certain parameters associated with the operation of the plugging control system 10 and/or the work vehicle. For example, the work vehicle controller 38 may receive signals from the agricultural implement controller 40 and/or the row unit controller 58 indicative of the plugging of the ground engaging component or of the row unit 22 generally and may receive other parameters associated with the operation of the agricultural implement 11 and/or the work vehicle 12. Such signals may be received at the processor 74 via the interface 76. In certain embodiments, the work vehicle controller 38 may receive signals directly from the sensors 32, 33, and 34 and/or output signals directly to the actuators 68, 69, 70, and 71. The parameters indicated by the signals and received by the work vehicle controller 38 may be stored in the memory 75.

Based on the signals received from the sensors 32, 33, and 34, any controller of the work vehicle controller 38, the agricultural implement controller 40, or the row unit controller 58 may determine an indication to be displayed on the user interface 36 and/or may determine a control operation. By way of example, the controller may receive the signal indicative of the plugging at a specific ground engaging component of the row unit 22. Based on the received signal, the controller may determine whether the plugging exceeds the threshold value. The threshold value may be established by the operator or may be determined by the controller based on certain conditions (e.g., the orientation of the ground engaging component, soil conditions and properties, residue conditions and properties, weather, a type of the agricultural product applied by the agricultural implement 11, environmental conditions, and other conditions). By way of example, as the depth of the ground engaging component (e.g., the residue managers, the opening disks, or the closing disks) increases, the plugging of the ground engaging component may be expected to increase. As such, the threshold value of the plugging may increase based on the increased depth of the ground engaging component. In certain embodiments, the operator may input some or all of the conditions to the user interface 36, and the controller may determine the threshold value based on some or all of the operator inputs (e.g., the conditions). Based on the comparison, the controller may output a monitoring signal to perform a monitoring operation (e.g., to inform the user of the plugging and/or of the plugging exceeding the threshold value at the particular row unit) and/or may output a control signal to perform a control operation (e.g., to move the ground engaging component or the row unit 22).

In the illustrated embodiment, the work vehicle controller 38 is communicatively coupled to the user interface 36 and operator controls 78. The user interface 36 may display certain parameters measured by the plugging control system 10 and/or certain determinations made by the plugging control system 10. For example, as illustrated, the user interface 36 includes visual indicators 79 that may be detectable by a user (e.g., the operator). The visual indicators 79 show whether the plugging exceeds the threshold value at individual row units 22. Each row unit 22 corresponds to a set of two visual indicators (e.g., R1, R2, R3, etc.). Each set includes two visual indicators 79 that indicate whether the plugging at a particular row unit 22 is below threshold value. For example, a first visual indicator 79 of the set R1 indicates that the plugging is below the threshold value at a first row unit 22, and a second visual indicator 79 of the set R1 indicates that the plugging exceeds the threshold value at the first row unit 22.

In certain embodiments, the user interface 36 may include other user-detectable indicators, in addition to or instead of the visual indicators 79, indicative of plugging at each ground engaging component of each respective row unit 22, indicative of plugging at each row unit 22 generally, indicative of plugging at the sections of the row units 22, or a combination thereof. For example, the user interface 36 may include a bar graph that displays individual bars representing each row unit 22 and the amount of plugging at each row unit 22. Each bar may be color-coded such that certain colors communicate the plugging (i.e., a yellow bar may indicate that the plugging is near but does not exceed the threshold value, and a red bar may indicate that the plugging exceeds the threshold value). The user interface 36 may include a map drawn in real time that indicates the rows formed by each row unit 22 and may indicate to the operator when the plugging exceeds the threshold value at a particular row unit 22. Further, the user interface 36 may include certain alerts (e.g., a pop-up window) that indicate the plugging exceeding the threshold value. In certain embodiments, the work vehicle controller 38 or the agricultural implement controller 40 may include the user interface 36.

The operator controls 78 may include certain mechanisms that enable the operator to perform control operations at the agricultural implement 11 and at the individual row units 22. For example, after viewing the visual indicators 79 and/or the other user-detectable indicators, the operator may perform the control operations at the individual row unit 22 based on the visual indicators 79. Such control operations may include moving, shaking, and/or adjusting a down pressure applied to the row unit 22 via the row unit actuator 68, moving, shaking, and/or adjusting a down pressure applied to the residue management system via the residue management system actuator 69, moving, shaking, and/or adjusting a down pressure applied to the opening system via the opening system actuator 70, moving, shaking, and/or adjusting a down pressure applied to the closing system via the closing system actuator 71, other control operations associated with the operation of the row unit 22, or a combination thereof. In certain embodiments, the work vehicle controller 38 may output signals indicative of such adjustments based on the operator inputs received at the operator controls 78. In some embodiments, the operator controls 78 may be included within the user interface 36. Further, as described herein, the controller of the plugging control system may automatically perform such control operations independent of the operator inputs (e.g., closed loop control via the work vehicle controller 38, via the agricultural implement controller 40, and/or via the row unit controller 58).

As described above, the plugging control system 10 includes a processor (e.g., the processor 48, the processor 60, and the processor 74) and a memory (e.g., the memory 50, the memory 62, and the memory 75). In some embodiments, each memory may include one or more tangible, non-transitory, computer-readable media that store instructions executable by the corresponding processor and/or data to be processed by the corresponding processor. Each memory may include random access memory (RAM), read-only memory (ROM), rewritable non-volatile memory (e.g., flash memory), hard drives, optical discs, or a combination thereof. The processors may include general-purpose microprocessors, one or more application specific integrated circuits (ASICs), one or more field programmable gate arrays (FPGAs), or a combination thereof.

Figure 3:
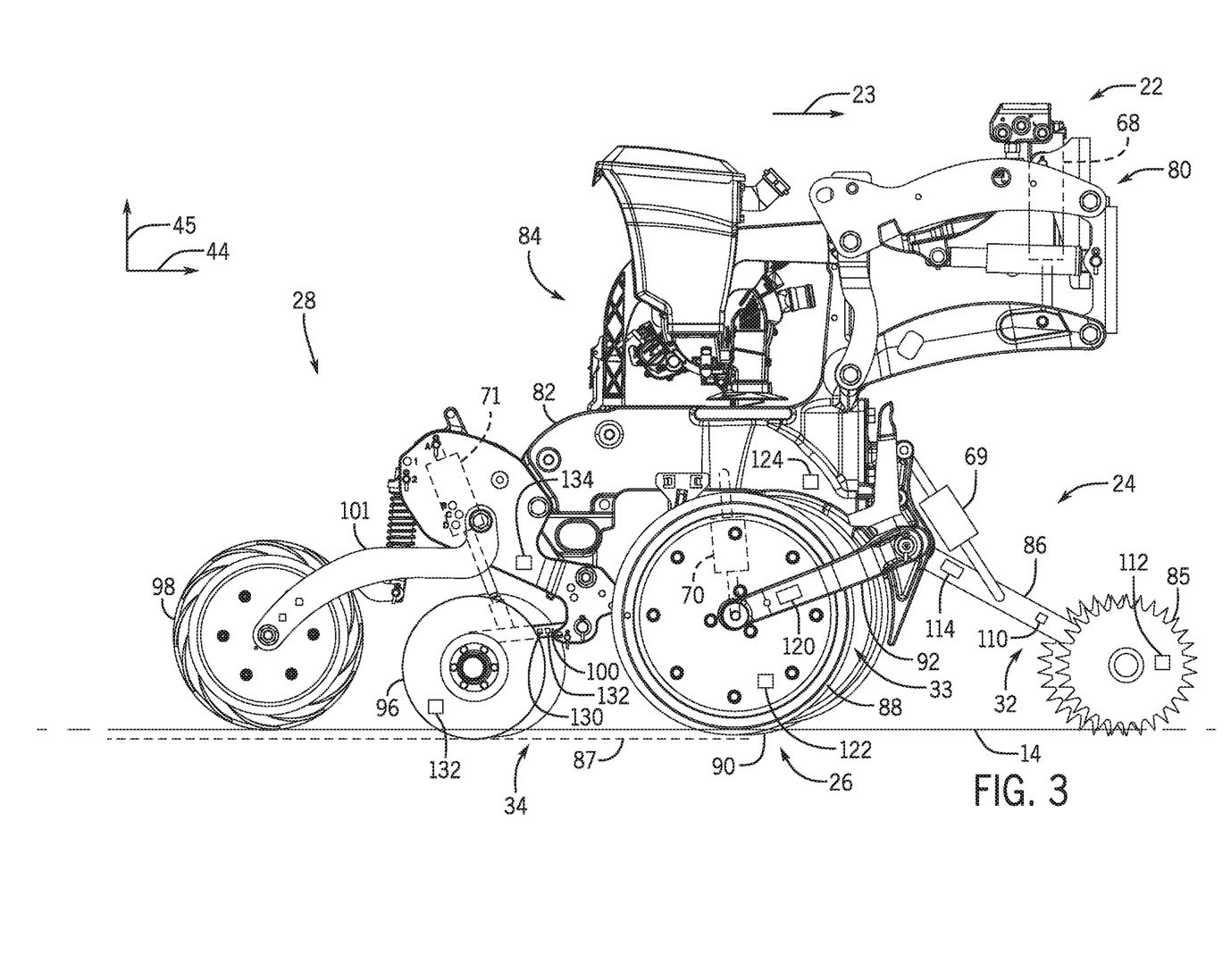
FIG. 3 is a side view of an embodiment of a row unit of the agricultural implement of FIG. 1, in accordance with an aspect of the present disclosure.

FIG. 3 is a side view of the row unit 22 of the agricultural implement of FIG. 1. As illustrated, the row unit 22 includes a linkage assembly 80 that couples a chassis 82 of the row unit 22 to the frame of the agricultural implement. As the agricultural implement is towed through the field 14, the row unit 22 is also towed through the field 14. The row unit 22 is configured to deposit the agricultural product (e.g., the seeds, the fertilizer, etc.) into the field 14. For example, the row unit 22 includes the agricultural product delivery system 84. The agricultural product delivery system 84 stores the agricultural product for deposition by the row unit 22. In certain embodiments, multiple row units 22 may share an agricultural product delivery system. The agricultural product delivery system 84 may include a metering system that meters the agricultural product in a predetermined fashion. For example, the metering system may include a vacuum, a mechanical metering wheel, other metering mechanisms, or a combination thereof.

As illustrated, the row unit 22 includes the residue management system 24 positioned generally in front of the opening system 26 along the longitudinal axis 44. The residue management system 24 includes residue managers 85 (e.g., rolling tines, blades, or disks) that clear the surface of the field 14 of debris (e.g., clods, crop residue, etc.) as the row unit 22 moves over the surface. The residue managers 85 are coupled to the row unit 22 via residue manager linkages 86 in front of and adjacent to the opening system 26 (e.g., generally below the linkage assembly 80). As the row unit 22 travels across the field 14, the residue managers 85 may rotate and conform to the soil of the field 14 in a manner that enables the opening system 26 to form a furrow 87. For example, the residue managers 85 may break apart clods of the soil, move residue and/or debris out of a pathway of the row unit 22, level out the soil, or a combination thereof. In certain embodiments, the residue management system 24 may include other mechanisms in addition to or instead of the residue managers 85 that engage the soil and manage the residue.

As illustrated, the opening system 26 of the row unit 22 includes the gauge wheels 88 and the opening disks 90. Each of the two opening disks 90 is coupled to a respective gauge wheel 88. The gauge wheels 88 and the opening disks 90 are coupled to the chassis 82 via opening disk linkage 92. The opening disks 90 penetrate a top surface of the field 14 to form the furrow 87 along the row of the row unit 22. The gauge wheels 88 rotate along the top surface of the field 14 beside the row and provide a reference level from which the opening disks 90 form the furrow 87. For example, the opening disks 90 and/or the gauge wheels 88 may be vertically adjustable to enable the operator to set a desired depth of the furrow 87. As the opening disks 90 penetrate the field 14, the furrow 87 is formed in the soil.

As illustrated, the closing system 28 of the row unit 22 includes closing disks 96 and a press wheel 98. The closing disks 96 and the press wheel 98 may form a two-stage closing system of the row unit 22. In the illustrated embodiment, the closing disks 96 include a closing disk 96 disposed on each side of the furrow 87. The pair of closing disks 96 may be axially offset by a fixed or an adjustment spacing. Further, to at least partially close the furrow 87, a first closing disk 96 fractures and/or mixes the soil from a first side of the furrow 87 into the furrow 87, and then a second closing disk 96 fractures and/or mixes the soil from a second side of the furrow 87 into the furrow 87. Additionally, each closing disk 96 may be disposed at an angle relative to the furrow 87. For example, the top ends of the closing disks 96 may be closer than the bottom ends of the closing disks 96. In some embodiments, the row unit 22 may include a single closing disk 96 that moves the soil into the furrow 87. The closing disks 96 are coupled to the row unit 22 (e.g., to the chassis 82) via a closing disk linkage 100.

The press wheel 98 is configured to compact the soil in the furrow 87 and/or to further fill the furrow 87 with the soil. The press wheel 98 is axially wider than the furrow 87 such that the press wheel 98 contacts the first side of the furrow 87 and the second side of the furrow 87. As the press wheel 98 rolls over the furrow 87, the press wheel 98 applies a downward force to the field 14 that compacts the soil. For example, to properly close the furrow 87, the press wheel 98 compacts the soil in the furrow 87 to be at generally the original ground level (e.g., the level of the soil on the first side and the second side of the furrow 87). The press wheel 98 is coupled to the row unit 22 (e.g., to the chassis 82) via a press wheel linkage 101.

In certain embodiments, the closing disks 96 or the press wheel 98 may be omitted from the closing system 28 such that the closing system 28 of the row unit 22 includes a single stage (e.g., only the closing disks 96 or only the press wheel 98). Additionally, in certain embodiments, the closing system 28 may include a single closing disk 96 and/or the press wheel 98. Further, some embodiments of the single stage closing system may include closing disks disposed at angles other than those described above for the closing disks 96.

In some embodiments, the closing system may include closing wheels (e.g., a pair of closing wheels) that roll generally along the surface of the soil to at least partially close the furrow by pushing soil into the furrow. For example, the bottom ends of the closing wheels may be closer than the top ends of the closing wheels such that the closing wheels from a "V-press" (e.g., the closing wheels may form the point of the "V" at the bottom ends of the wheels). The closer distance between the bottom ends of the closing wheels may enable the closing wheels to close the furrow (e.g., to move the soil into the furrow from the sides of the furrow). The closing wheels may be coupled to the chassis of the row unit by a closing wheel linkage.

As described herein, the plugging control system and the row unit 22 include sensors (e.g., the residue management system sensors 32, the opening system sensors 33, and the closing system sensors 34) that sense plugging of the ground engaging components (e.g., the residue management system 24, the opening system 26, and the closing system 28) and/or that sense parameters indicative of plugging. For example, the residue management system 24 may become plugged with soil and other debris during operation (e.g., soil and other debris may build up and/or become lodged between the residue managers 85). As illustrated, the residue management system sensors 32 include a strain sensor 110, a position sensor 112, and a presence sensor 114. The strain sensor 110 may sense and output sensor signals indicative of a strain and/or a compression of the residue manager linkage 86 during operation of the row unit 22. The position sensor 112 may sense and output sensor signals indicative of a position, an orientation, and/or a rotational value of the residue managers 85. The presence sensor 114 may sense and output sensor signals indicative of the presence of the plugging at the residue management system 24. In certain embodiments, the strain/compression on the residue manager linkage 86, the position, the orientation, and the rotational value of the residue managers 85, and the presence of the plugging may be indicative of the plugging of the residue management system 24. As such, the sensors 110, 112, and 114 may output sensor signals indicative of the plugging of the residue management system 24 to the controller of the plugging control system. In certain embodiments, the controller may determine the plugging based on the sensor signals received from the sensors 110, 112, and 114 (e.g., may determine the plugging based on the strain/compression, the position/orientation/rotational value, and the presence of the plugging).

As illustrated, the plugging control system and the row unit 22 include the row unit actuator 68, the residue management system actuator 69, the opening system actuator 70, and the closing system actuator 71. The row unit actuator 68, the residue management system actuator 69, the opening system actuator 70, and the closing system actuator 71 include pneumatic cylinders configured to apply the down forces to the opening system 26 and the closing system 28, respectively. In certain embodiments, the row unit actuator, the residue management system actuator, the opening system actuator, and the closing system actuator may be other types of actuators (e.g., hydraulic cylinders, springs, hydro-pneumatic cylinders, electro-mechanical motors, etc.).

As illustrated, the residue management system actuator 69 is coupled to the chassis 82 and to the residue manager linkages 86. The residue management system actuator 69 may move the residue managers 85 generally along the longitudinal axis 44 and/or along the vertical axis 45, may shake the residue managers 85 generally along the longitudinal axis 44 and/or along the vertical axis 45, and/or may adjust a pressure applied by the residue management system 24 to the field 14. In some embodiments, the residue management system actuator 69 may adjust a geometry of the residue managers 85 relative to other portions of the row unit 22 and/or relative to the surface of the field 14. Further, the residue management system actuator 69 may be controlled by the controller of the plugging control system. As such, the residue management system actuator 69 may be controlled by the controller based on the plugging sensed by the sensors 110, 112, and 114 and/or based on the plugging exceeding the threshold value. Additionally or alternatively, the controller may notify the user of the plugging at the residue management system 24 (e.g., may output a monitoring signal indicative of instructions to provide a user-detectable alert or perform other monitoring operation(s)).

The opening system 26 may become plugged with soil and other debris during operation (e.g., soil and other debris may build up and/or become lodged between the gauge wheels 88 and/or between the opening disks 90). As illustrated, the opening system sensors 33 include a draft load sensor 120, a position sensor 122, and a presence sensor 124. The draft load sensor 120 may sense and output sensor signals indicative of a draft load on the opening disk linkage 92 during operation of the row unit 22. The position sensor 122 may sense and output sensor signals indicative of a position, orientation, and/or rotational value of the gauge wheels 88 and the opening disks 90. The presence sensor 124 may sense and output sensor signals indicative of the presence of the plugging at the opening system 26. In certain embodiments, the draft load on the opening disk linkage 92, the position, the orientation, and the rotational value of the gauge wheels 88 and the opening disks 90, and the presence of the plugging may be indicative of the plugging of the opening system 26. As such, the sensors 120, 122, and 124 may output sensor signals indicative of the plugging of the opening system 26 to the controller of the plugging control system. In certain embodiments, the controller may determine the plugging based on the sensor signals received from the sensors 120, 122, and 124 (e.g., may determine the plugging based on the draft load, the position/orientation/rotational value, and the presence of the plugging).

As illustrated, the plugging control system and the row unit 22 include the opening system actuator 70 coupled to the chassis 82 and to the opening disk linkage 92. The opening system actuator 70 may move the gauge wheels 88 and the opening disks 90 generally along the longitudinal axis 44 and/or along the vertical axis 45, may shake the gauge wheels 88 and the opening disks 90 generally along the longitudinal axis 44 and/or along the vertical axis 45, and/or may adjust a pressure applied by the opening system 26 to the field 14. Further, the opening system actuator 70 may be controlled by the controller of the plugging control system. As such, the opening system actuator 70 may be controlled by the controller based on the plugging sensed by the sensors 120, 122, and 124, the plugging determined by the controller based on the parameters sensed by the sensors 120, 122, and 124, and/or based on the plugging exceeding the threshold value. Additionally or alternatively, the controller may notify the user of the plugging at the opening system 26 (e.g., may output a monitoring signal indicative of instructions to provide a user-detectable alert or perform other monitoring operation(s)).

The closing system 28 may become plugged with soil and other debris during operation (e.g., soil and other debris may build up and/or become lodged between the closing disks 96). As illustrated, the closing system sensors 34 include a draft load sensor 130, a position sensor 132, and a presence sensor 134. The presence sensors described herein (e.g., the presence sensor 114, the presence sensor 124, and the presence sensor 134) may include a camera, an ultrasonic sensor, an electrostatic sensor, an inductive sensor, a Light Detection and Ranging (LIDAR) sensor, a radar sensor, other sensors configured to sense the presence of plugging of the ground engaging components, or a combination thereof. The draft load sensor 130 may sense and output sensor signals indicative of a draft load on the closing disk linkage 100 during operation of the row unit 22. The position sensor 132 may sense and output sensor signals indicative of a position, orientation, and/or rotational value of the closing disks 96. The presence sensor 134 may sense and output sensor signals indicative of the presence of the plugging at the closing system 28. In certain embodiments, the draft load on the closing disk linkage 100, the position, the orientation, and the rotational value of the closing disks 96, and the presence of the plugging may be indicative of the plugging of the closing system 28. As such, the sensors 130, 132, and 134 may output sensor signals indicative of the plugging of the closing system 28 to the controller of the plugging control system. In certain embodiments, the controller may determine the plugging based on the sensor signals received from the sensors 130, 132, and 134 (e.g., may determine the plugging based on the draft load, the position/orientation/rotational value, and the presence of the plugging).

As illustrated, the plugging control system and the row unit 22 include the closing system actuator 71 coupled to the chassis 82 and to the closing disk linkage 100. The closing system actuator 71 may move the closing disks 96 generally along the longitudinal axis 44 and/or along the vertical axis 45, may shake the closing disks 96 generally along the longitudinal axis 44 and/or along the vertical axis 45, and/or may adjust a pressure applied by the closing system 28 to the field 14. In some embodiments, the closing system actuator 71 may adjust a geometry of the closing disks 96 relative to other portions of the row unit 22 and/or relative to the surface of the field 14. Further, the closing system actuator 71 may be controlled by the controller of the plugging control system. As such, the closing system actuator 71 may be controlled by the controller based on the plugging sensed by the sensors 130, 132, and 134, the plugging determined by the controller based on the parameters sensed by the sensors 130, 132, and 134, and/or based on the plugging exceeding the threshold value. Additionally or alternatively, the controller may notify the user of the plugging at the closing system 28 (e.g., may output a monitoring signal indicative of instructions to provide a user-detectable alert or perform other monitoring operation(s)).

As illustrated, the plugging control system and the row unit 22 include the row unit actuator 68 coupled to the linkage assembly 80. As described herein, the row unit actuator 68 may actuated based on the sensed plugging of the ground engaging components. For example, based on the sensed plugging of the residue management system 24, the opening system 26, the closing system 28, or a combination thereof, and/or based on the sensed plugging exceeding the threshold value, the controller of the plugging control system may output a control signal to the row unit actuator 68 indicative of instructions to move, shake, and/or adjust a pressure applied by the row unit 22. In response, the row unit actuator 68 may move the row unit 22 generally along the longitudinal axis 44 and/or along the vertical axis 45, may shake the row unit 22 generally along the longitudinal axis 44 and/or along the vertical axis 45, and/or may adjust a pressure applied by the row unit 22 to the field 14. Additionally or alternatively, the controller may notify the user of the plugging at the row unit 22 (e.g., may output a monitoring signal indicative of instructions to provide a user-detectable alert or perform other monitoring operation(s)). The control operations described herein (e.g., moving, shaking, and/or adjusting the pressure applied by ground engaging component or the row unit 22) may dislodge and/or break up the residue and other debris plugging the ground engaging component (e.g., the residue management system 24, the opening system 26, and the closing system 28).

In certain embodiments, the sensors described herein (e.g., the residue management system sensors 32, the opening system sensors 33, and the closing system sensors 34) may detect damage to the ground engaging components as the row unit 22 moves through and over the field 14. For example, during operation, rocks and other debris may contact and damage portions of the ground engaging components, and the sensors may detect and notify the user of such damage.

Figure 4:
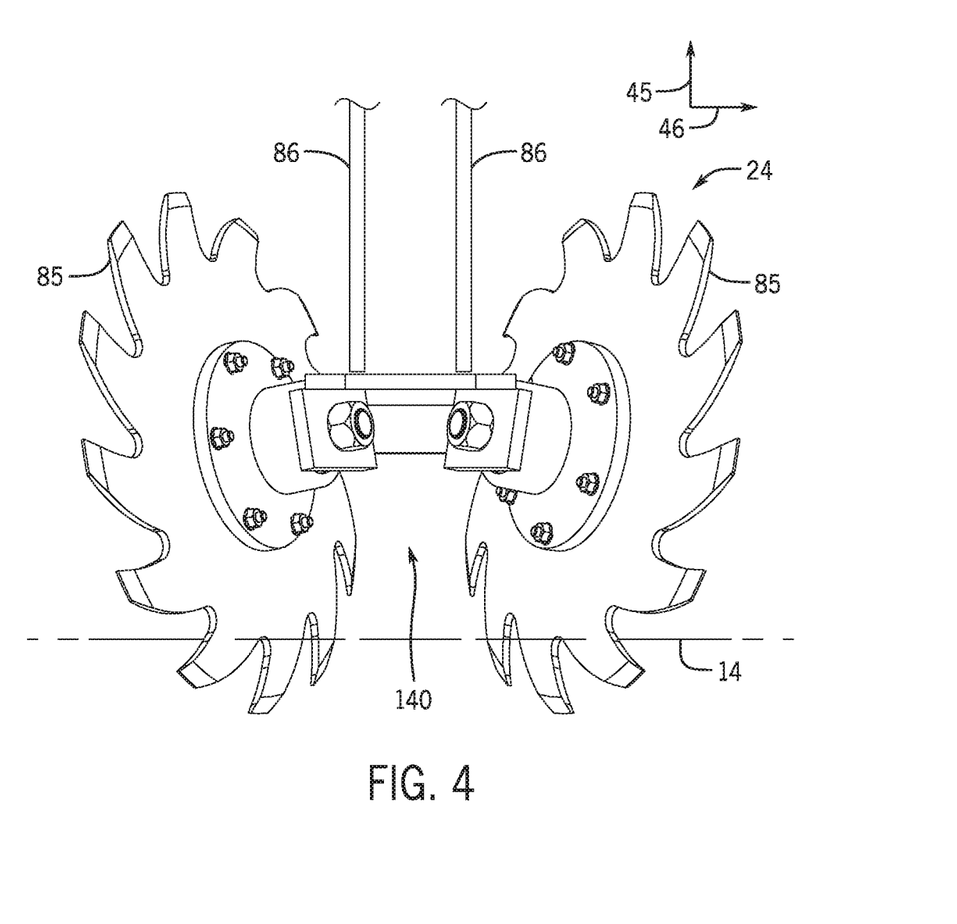
FIG. 4 is a rear view of an embodiment of a residue management system of the row unit of FIG. 3, in accordance with an aspect of the present disclosure.

FIG. 4 is a rear view of an embodiment of the residue management system 24 of the row unit of FIG. 3. As illustrated, the residue management system 24 includes the residue managers 85 coupled to the chassis of the row unit by the residue manager linkages 86. During operation of the row unit, the residue managers 85 clear the surface of the field 14 of residue (e.g., clods, debris, etc.) by rotating generally about the lateral axis 46 and by conforming the soil of the field 14 in a manner that enables the opening system to form the furrow. As the row unit moves along the field 14, a gap 140 between the residue managers 85 may become plugged with soil and other debris. For example, the soil and the other debris may at least partially prevent the residue managers 85 from rotating and/or may inhibit efficient operation of the residue managers 85. The residue management system sensors may sense the plugging of the residue management system 24 (e.g., may sense the soil and the other debris within the gap 140) and may output sensor signals indicative of the plugging to the controller of the plugging control system. In response, the controller may output a monitoring signal to perform a monitoring operation (e.g., to notify a user of the plugging of the residue management system 24) and/or may output a control signal to perform a control operation (e.g., to move, shake, and/or adjust a pressure applied by the residue managers 85 to the field 14 to dislodge and/or to remove the soil and the other debris from the gap 140). As such, the plugging control system may enhance an efficiency of the residue management system 24 and the row unit generally.

Figure 5:
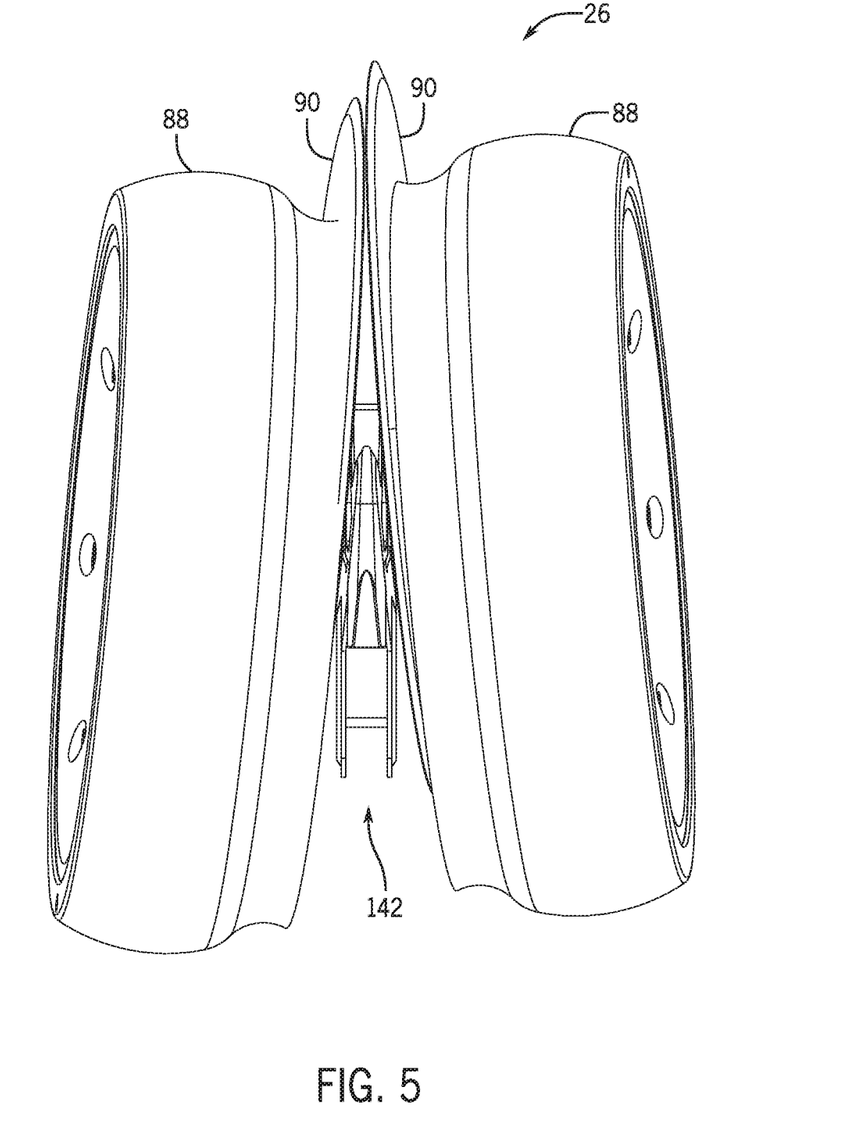
FIG. 5 is a bottom view of an embodiment of an opening assembly of the row unit of FIG. 3, in accordance with an aspect of the present disclosure.

FIG. 5 is a bottom view of an embodiment of the opening system 26 of the row unit of FIG. 3. As illustrated, the opening system 26 includes the gauge wheels 88 and the opening disks 90. During operation of the row unit, the opening disks 90 penetrate the top surface of the field 14 to form the furrow along the row of the row unit. The gauge wheels 88 rotate along the top surface of the field 14 beside the row and provide a reference level from which the opening disks 90 form the furrow. As the row unit moves along the field 14, a gap 142 between the opening disks 90 may become plugged with soil and other debris. For example, the soil and the other debris may at least partially prevent the opening disks 90 from rotating and forming the furrow, and/or may inhibit efficient operation of the opening disks 90. The opening system sensors may sense the plugging of the opening system 26 (e.g., may sense the soil and the other debris within the gap 142) and may output sensor signals indicative of the plugging to the controller of the plugging control system. In response, the controller may output a monitoring signal to perform a monitoring operation (e.g., to notify a user of the plugging of the opening system 26) and/or may output a control signal to perform a control operation (e.g., to move, shake, and/or adjust a pressure applied by the gauge wheels 88 and the opening disks 90 to the field 14 to dislodge and/or to remove the soil and the other debris from the gap 142). As such, the plugging control system may enhance an efficiency of the opening system 26 and the row unit generally.

Figure 6:
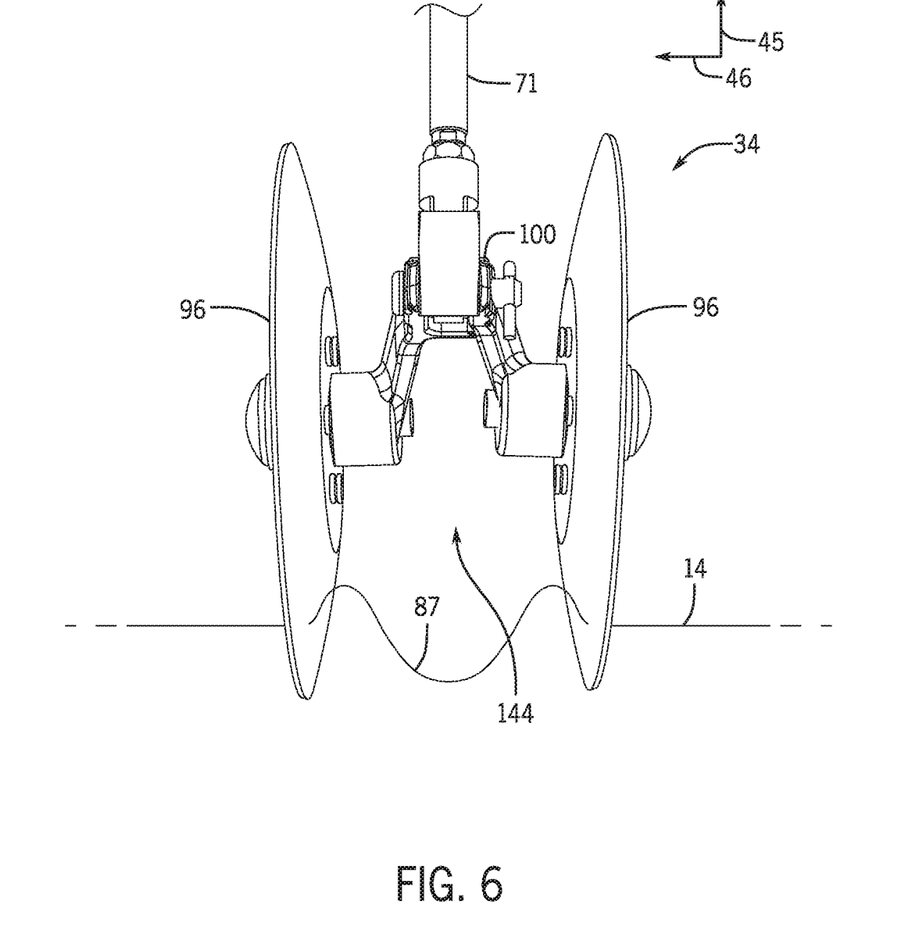
FIG. 6 is a front view of an embodiment of a closing assembly of the row unit of FIG. 3, in accordance with an aspect of the present disclosure.

FIG. 6 is a front view of an embodiment of the closing system 28 of the row unit of FIG. 3. As illustrated, the closing system 28 includes the closing disks 96. During operation of the row unit, to at least partially close the furrow 87, a first closing disk 96 fractures and/or mixes the soil from a first side of the furrow 87 into the furrow 87, and then a second closing disk 96 fractures and/or mixes the soil from a second side of the furrow 87 into the furrow 87. As the row unit moves along the field 14, a gap 144 between the closing disks 96 may become plugged with soil and other debris. For example, the soil and the other debris may at least partially prevent the closing disks 96 from rotating and closing the furrow, and/or may inhibit efficient operation of the closing disks 96. The closing system sensors may sense the plugging of the closing system 28 (e.g., may sense the soil and the other debris within the gap 144) and may output sensor signals indicative of the plugging to the controller of the plugging control system. In response, the controller may output a monitoring signal to perform a monitoring operation (e.g., to notify a user of the plugging of the closing system 28) and/or may output a control signal to perform a control operation (e.g., to move, shake, and/or adjust a pressure applied by closing disks 96 to the field 14 to dislodge and/or to remove the soil and the other debris from the gap 144). As such, the plugging control system may enhance an efficiency of the closing system 28 and the row unit generally.

Figure 7:
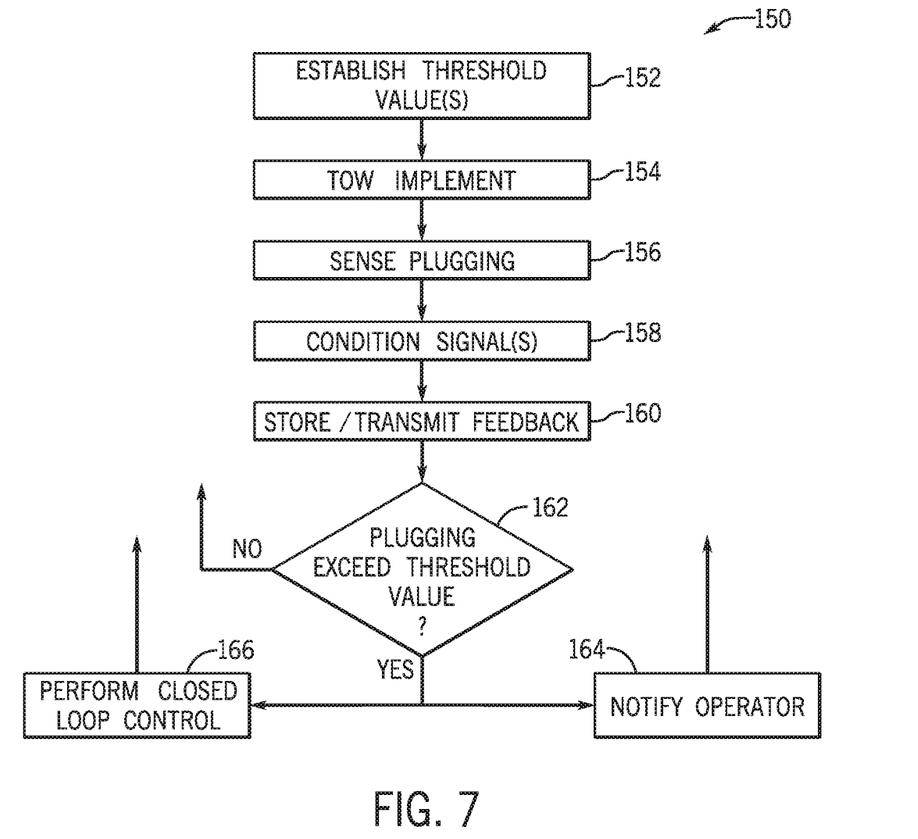
FIG. 7 is a flowchart of an embodiment of a method for the plugging control system of FIG. 1, in accordance with an aspect of the present disclosure.

FIG. 7 is a flowchart of an embodiment of a method 150 for the plugging control system of FIG. 1. The method 150 begins at block 152, where threshold value(s) are established. The threshold value(s) may be used by the controller to perform certain monitoring and/or certain control operations. The threshold value(s) may be provided/selected by the operator and/or may be automatically determined by the controller. For example, a threshold value may depend on an orientation of the ground engaging component, soil moisture, a type of soil, other soil conditions and properties, other residue conditions and properties, weather, a type of the agricultural product applied by the row unit, and other conditions. The threshold value(s) are compared by the controller to values sensed by the sensors of the plugging control system (e.g., the residue management system sensors, the opening system sensors, and the closing system sensors) to determine whether certain control operations should be performed by the plugging control system or whether certain measurements/alerts should be reported to the operator. In certain embodiments, each ground engaging component may have a different and/or an independent threshold value. For example, the residue management system may have a first threshold value, the opening system may have a second threshold value, and the closing system may have a third threshold value.

At block 154, the work vehicle tows the agricultural implement through the field. As the work vehicle tows the agricultural implement, the row units of the agricultural implement engage the soil of the field. For example, the opening system of the row units engage the soil to open the furrows in the field, the row units deposit the seeds into the furrows, and the closing system push the soil into the furrows to close the furrows. As the work vehicles tows the agricultural implement, the ground engaging components of the row unit (e.g., the residue management system, the opening system, and the closing system) may become plugged with soil and/or other debris.

At block 156, the plugging control system sensed the plugging of the ground engaging components of the row unit. For example, the plugging control system may sense plugging of the residue management system via the residue management system sensors, may sense plugging of the opening system via the opening system sensors, may sense plugging of the closing system via the closing system sensors, or a combination thereof. The sensing by the sensors may be at periodic time intervals, based on a user input, in response to a triggering event (e.g., a sensed condition), or a combination thereof. The sensors of the plugging control system may output signals to the controller indicative of the sensed measurements. At block 158, the signals output by the sensors are conditioned. For example, a low pass filter may condition the signals for receipt by the controller of the plugging control system. At block 160, the signals are received at the controller and the values indicated by the signals are stored the memory of the controller. The values are also transmitted to the processor of the controller. Additionally or alternatively, the controller may determine the plugging at each ground engaging component based on the parameters sensed by the sensors (e.g., may determine the plugging based on the sensed draft load on the ground engaging component, based on the position, the orientation, and/or the rotational value of the ground engaging component, based on the presence of the plugging of the ground engaging component, or a combination thereof).

At query 162, the controller determines whether the plugging exceeds the threshold value. For example, the controller may compare the plugging, as received from the sensor(s) of the plugging control system, to the threshold value previously established at block 152. If the controller determines that the plugging does not exceed the threshold value, the method 150 returns to a previous block (i.e., to one of the blocks 152-156). If the controller determines that the plugging exceeds the threshold value, the method 150 proceeds to blocks 164 and 166. At block 164, the plugging control system performs a monitoring operation (e.g., notifies the operator of the plugging and/or of the plugging exceeding the threshold value). For example, the controller may output signals to the user interface to provide user-detectable alerts for viewing by the operator. At block 166, in addition to or independent of block 164, the plugging control system the controller performs a control operation (e.g., performs closed loop control of certain components of the respective row unit). For example, the controller may output control signals to the actuator(s) of the row unit to move, shake, and/or adjust a pressure applied by the row unit or by the ground engaging component.

After completing the blocks 164 and/or 166, the method 150 may return to a previous block (i.e., to one of the blocks 152-156). For example, after performing the closed loop control at block 166, the method 150 may return to block 156 to again sense the plugging of the ground engaging component. If the plugging continues to exceed the threshold value (e.g., query 162), the plugging control system may notify the operator both of the plugging and of the unsuccessful attempt to dislodge and/or remove the plugging (e.g., block 164). Additionally or alternatively, the plugging control system may attempt a second time to perform closed loop control (e.g., block 166) to dislodge and/or remove the plugging.

Accordingly, the plugging control system described herein may enable the work vehicle, the agricultural implement, the operator, a combination thereof, to improve operation of row units of the agricultural implement and/or to improve operation of grounding components of the row units (e.g., a residue management system, an opening system, and a closing system). For example, as the row unit operates to form the furrow, deposit the agricultural product into the furrow, and close the furrow, the plugging control system may sense plugging of the ground engaging components. The plugging control system may compare the plugging to a threshold value to determine whether the plugging exceeds the threshold value. In response to determining that the plugging exceeds the threshold value, the plugging control system may notify the operator of the plugging exceeding the threshold value and/or may perform a closed loop control operation at the respective row unit and/or at the respective ground engaging component to improve operation of the row unit generally and/or of the ground engaging component. As described herein, the plugging of the ground engaging components may affect performance of the ground engaging components (e.g., may affect residue management by the residue management system, may affect formation of the furrow by the opening system, and may affect closure of the furrow by the closing system), among other operating characteristics. As such, the ability of the plugging control system to sense the plugging, to notify the operator, and to perform the closed loop control operation enables the plugging control system to improve formation and closure of the furrow, along with general operation of the row unit. The quality of the closure of the furrow over the agricultural product may affect crop yields, an amount of the agricultural product that is applied, and other factors. Improved crop yields may provide increased profits for the operator of the plugging control system.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A plugging control system for an agricultural implement, comprising:
   a sensor configured to output a sensor signal indicative of plugging of a ground engaging component, wherein the sensor is configured to sense the plugging of the ground engaging component by sensing a strain on the ground engaging component or on a linkage coupled to the ground engaging component; and
   a controller comprising a processor and a memory, wherein the controller is configured to:
      receive the sensor signal indicative of the plugging of the ground engaging component from the sensor;
      determine whether the plugging exceeds a threshold value; and
      in response to the plugging exceeding the threshold value, output a monitoring signal to perform a monitoring operation, output a control signal to perform a control operation, or both.

2. The plugging control system of claim 1, wherein the monitoring operation comprises providing, at a user interface, an alert indicative of the plugging exceeding the threshold value.

3. The plugging control system of claim 1, wherein the sensor is configured to sense residue buildup, root ball lodging, rock lodging, or a combination thereof.

4. The plugging control system of claim 1, comprising an actuator coupled to the ground engaging component and configured to move the ground engaging component.

5. The plugging control system of claim 4, wherein the control operation comprises the actuator moving the ground engaging component.

6. The plugging control system of claim 1, wherein the ground engaging component comprises a closing system configured to close a furrow formed by the agricultural implement.

7. The plugging control system of claim 6, wherein the closing system comprises a pair of closing disks and a press wheel.

8. The plugging control system of claim 6, wherein the closing system comprises a pair of closing wheels.

9. The plugging control system of claim 1, wherein the controller is configured to determine the threshold value based on a depth of the ground engaging component.

10. The plugging control system of claim 1, wherein the controller is configured to determine the threshold value based on an orientation of the ground engaging component, one or more soil conditions, one or more soil properties, one or more residue conditions, one or more residue properties, weather, a type of agricultural product applied by the agricultural implement, one or more environmental conditions, or a combination thereof.

11. A plugging control system for an agricultural implement, comprising:
   an actuator configured to move a row unit of the agricultural implement;

a sensor configured to output a sensor signal indicative of plugging of the row unit, wherein the sensor is configured to sense the plugging of the row unit by sensing a strain on the row unit; and a controller comprising a processor and a memory, wherein the controller is configured to:
- receive the sensor signal indicative of the plugging of the row unit from the sensor;
- determine whether the plugging exceeds a threshold value; and
- in response to the plugging exceeding the threshold value, output a monitoring signal to perform a monitoring operation, output a control signal to perform a control operation, or both.

12. The plugging control system of claim 11, wherein the control operation comprises the actuator moving the row unit generally up and down, shaking the row unit, or both.

13. The plugging control system of claim 11, wherein the control operation comprises adjusting a pressure applied by the row unit, via the actuator, to soil.

14. The plugging control system of claim 11, wherein the plugging of the row unit comprises plugging of a ground engaging component of the row unit.

15. The plugging control system of claim 11, wherein the monitoring operation comprises providing, at a user interface, an alert indicative of the plugging exceeding the threshold value.

16. An agricultural implement, comprising:
- a row unit comprising a ground engaging component and a first actuator configured to move the ground engaging component;
- a sensor configured to output a sensor signal indicative of plugging of the ground engaging component, wherein the sensor is configured to sense the plugging of the ground engaging component by sensing a strain on the ground engaging component or on a linkage coupled to the ground engaging component; and
- a controller comprising a processor and a memory, wherein the controller is configured to:
  - receive the sensor signal indicative of the plugging of the ground engaging component from the sensor;
  - determine whether the plugging exceeds a threshold value; and
  - in response to the plugging exceeding the threshold value, output a monitoring signal to perform a monitoring operation, output a control signal to perform a control operation, or both.

17. The agricultural implement of claim 16, comprising a second actuator, wherein the second actuator is configured to move the row unit, and the control operation comprises the second actuator moving the row unit generally up and down, shaking the row unit, or both.

18. The agricultural implement of claim 16, wherein the control operation comprises the first actuator moving the ground engaging component.

19. The agricultural implement of claim 16, wherein the ground engaging component comprises an opening system configured to form a furrow in soil.

20. The agricultural implement of claim 19, wherein the control operation comprises adjusting a pressure applied by the opening system, via the first actuator, to soil.

* * * * *